Patented Aug. 18, 1925.

1,549,888

UNITED STATES PATENT OFFICE.

GEORGE WELLINGTON MILES, OF BOSTON, MASSACHUSETTS, ASSIGNOR TO THE AMERICAN CELLULOSE & CHEMICAL MANUFACTURING COMPANY, LTD., OF NEW YORK, N. Y.

PHENOL-ALDEHYDE CONDENSATION PRODUCT AND PROCESS OF PRODUCING IT.

No Drawing. Application filed August 1, 1924. Serial No. 729,518.

*To all whom it may concern:*

Be it known that I, GEORGE WELLINGTON MILES, a citizen of the United States, residing at Boston, in the county of Suffolk and State of Massachusetts, have invented certain new and useful Improvements in Phenol-Aldehyde Condensation Products and Processes of Producing Them, of which the following is a specification.

I have found that by replacing the known condensation agents like alkalies, acids, hexamethylenetetramine and others by stannous chloride $SnCl_2$ immediate reaction results between aldehydes and phenols.

The result of this invention is rather surprising inasmuch as, for instance, other salts like stannic chloride $SnCl_4$ do not give any reaction.

The invention is carried out in the same way as the very well known processes of manufacturing condensation products of aldehydes and phenols which have been described in many patents and many articles in the chemical press. It is, therefore, superfluous to describe the process any further—I only add that the action of stannous chloride is so energetic and violent that it is good in starting the reaction of condensation to employ cooling, so as not to allow the reaction temperature to rise too high.

The products so obtained can be washed free from any foreign materials by treating in any suitable way and can be used as is or with addition of softeners, solvents, filling material, dyes, dyestuffs, resins or rosin, organic or inorganic derivatives of cellulose like esters or ethers of cellulose.

The masses so obtained can be treated in the usual way according to the well known methods for these condensation products.

The reaction can of course be carried out in the presence of appropriate solvents or diluents.

I claim as my invention:

Process of manufacture of condensation products between aldehydes and phenols in the presence of stannous chloride $SnCl_2$.

In testimony whereof, I have hereunto subscribed my name.

GEORGE WELLINGTON MILES.